Patented May 10, 1938

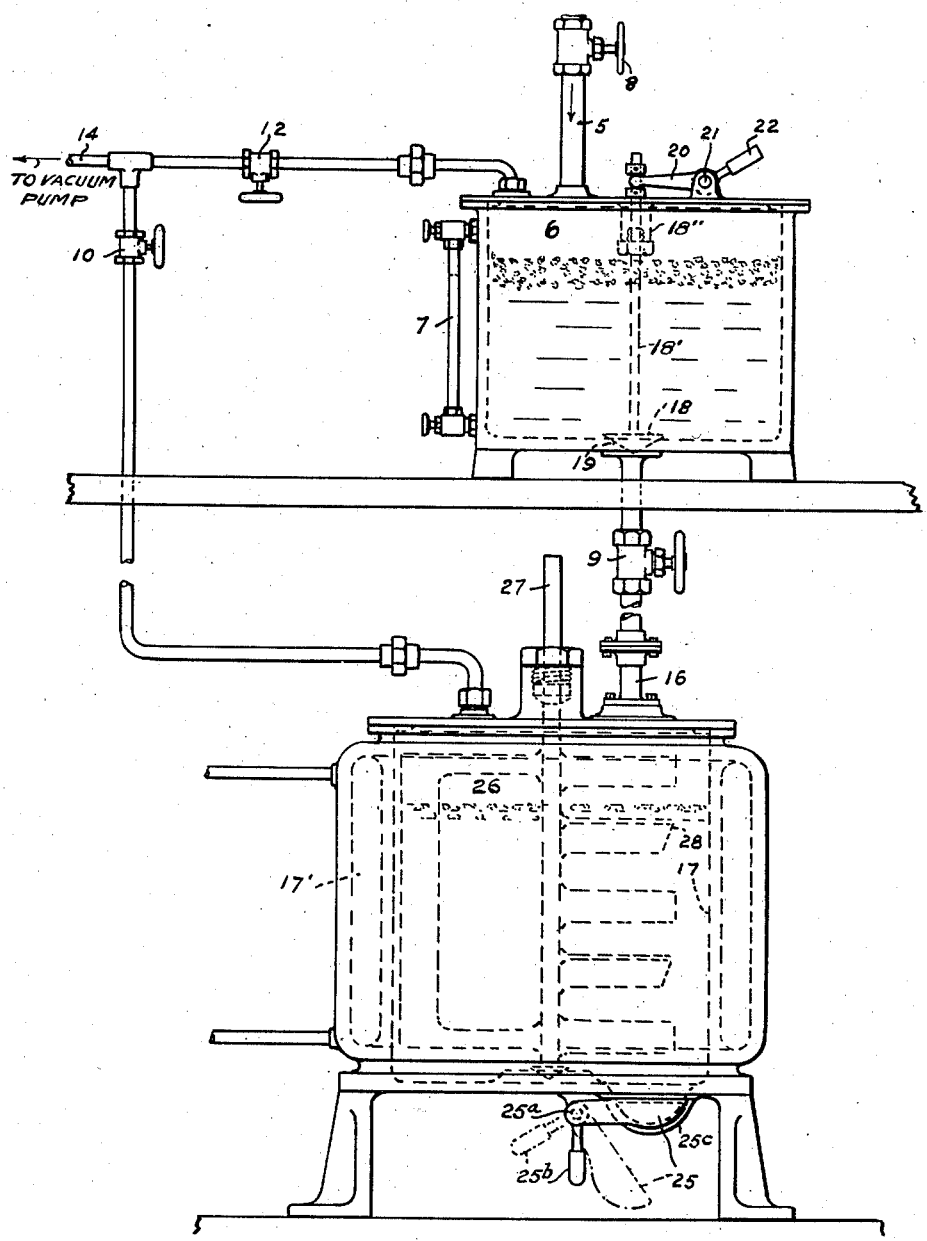

2,117,215

UNITED STATES PATENT OFFICE 2,117,215

FRUIT JUICE EXTRACTING AND DISTRIBUTING METHOD

Valentine Ruch, Englewood, N. J.

Application July 17, 1936, Serial No. 91,042

5 Claims. (Cl. 99—155)

This invention relates to methods for preserving liquids and more particularly to methods for extracting, preserving and distributing the juices of citrus and other fruits though it is noted that in some of the broader claims the invention is not limited to extracting or distributing, and in others not even to preserving of fruit juices.

Objects of the invention are to provide an improved method of this kind for effectively preserving the juices practically indefinitely without deterioration in taste or otherwise, and for preventing the start of fermentation.

Other objects of the invention are to accomplish the above method without heating the juice, to prevent the separation of the water from the solids of the juice, and to decrease the volume and weight of the juice to save transportation and storage costs.

Additional objects of the invention are to improve generally the simplicity and efficiency of such methods and to provide an extremely simple method of this kind which is economical, effective, and reliable in operation, and economical to install.

Still other objects of the invention will appear as the description proceeds; and while herein details of the invention are described in the specification and some of the claims, the invention is not limited to these, since many and various changes may be made without departing from the scope of the invention as claimed in the broader claims.

The inventive features for the accomplishment of these and other objects are shown herein in connection with a fruit juice extracting and distributing method which briefly stated, includes precooling the whole fruit before cutting, extracting the juice while the fruit is cold, and subjecting the juice to a partial vacuum, while agitating and slowly freezing the juice to slush form. The slush is then frozen to solid brick form or other desired form and kept in this solid form until ready for use, at which time it is defrosted at room temperature, in a refrigerator or at other temperature.

The drawing shows diagrammatically, by way of example, one of many possible apparatus by which the method may be performed.

My method of extracting and distributing juices of fruit is suitable for the juice of citrus fruits, pineapple, pear, berry and fruit juices and liquids in general, but is particularly suitable for citrus fruits, and will here be so described.

The citrus fruit is precooled at about 40 degrees F., and is then cut, without peeling, at right angles to its segments and subjected to a reaming or squeezing process or both for extracting the juice, after which the extracted material is strained to remove seed, but is not filtered, as filtering would remove pulp, which contains vitamin "C".

This process of extraction and straining unavoidably incorporates some air into the juice, which is undesirable, as the oxygen of the air attacks the juice, especially its vitamines, and if allowed to remain causes undesirable fermentation and oxidation of the juice. Therefore my method provides for the immediate removal of the air from the juice.

To this end, immediately after straining, the juice is subjected to a partial or approximate vacuum for ½ to 5 minutes, preferably about a minute, for extracting the air from the juice, thereby extracting fermentation supporting oxygen from the juice and the foam that forms thereon. To accomplish this, the juice is run through pipe 5 into the vacuum tank 6 until a proper quantity of juice is in the tank, as indicated by the gage 7, whereupon valves 8, 9 and 10 are closed. Then the valve 12 is opened and air in vacuum tank 6 is drawn out through the pipe 14 by a vacuum pump, (not shown) to which the pipe is connected, thus producing a partial vacuum in the tank.

This partial vacuum causes the withdrawal of the air from the juice, causing foam to collect thereon, but the reduced pressure causes foam bubbles to expand and rupture, as also does the shock of the returning atmospheric pressure incident to closing the valve 12 and opening the valve 8. The combination of these two physical forces flattens out the foam and removes substantially all the air imprisoned in the foam and much of the air from the body of the juice. No pulp is removed by this process.

The admission of atmospheric pressure through the valve 8 allows the foam-free juice to run by gravity, through the pipe 16 into the freezer cylinder 17 (having a jacket 17' for the freezing medium), when the valve 9 is opened and the valve member 18 is raised from the seat 19 by the raising of the stem 18' by means of the lever 20 pivoted on the shaft 21 and provided with a handle 22. The stem 18' passes through a suitable stuffing box 18".

The valve 25 at the bottom of the freezer was previously closed, and when sufficient juice has run from the tank 6 into the cylinder, as indicated by the gage 7, the valves 9 and 12 are closed, valve 10 is opened and a partial vacuum is produced in the space 26 in the upper part of the cylinder. The shaft 27 and dash 28 are then set in motion by a suitable source of power (not shown) and the partial vacuum is sustained while the juice is agitated and slowly frozen at about 28 degrees F. or other suitable temperature for about 5 to 10 minutes, until it reaches a consistency of mush or slush, thereby to prevent the separating out of the solids and the formation of scum during the defrosting later to be mentioned. The partial vacuum prevents reentry of air into the juice during freezing. The valve 25 operated by the handle 25b is pivoted at 25a and slides on a vertical face of the discharge end of a spout 25c.

The pressures of the partial vacuum in the tank 6 and freezer may be between 20 and 29 inches of mercury, preferably about 24 inches; and the removal of air as a result of the partial vacuum in the spaces 6 and 26 reduces the volume of the product about 32%.

The valve 25 is then opened, and the slush run into containers or molds. The slush in these containers is then stored in a hardening room at about 0 degree to 10 degrees F. to freeze the slush to solid form.

Said containers may be two-quart cardboard containers or containers of other sizes, shapes or materials, if desired lined with parchment paper, bags or other linings. Or the slush may be frozen in molds and merely wrapped in parchment paper or the like.

The product is now ready for shipment or storing in containers, or ready for use when having been defrosted.

I claim as my invention:

1. A fruit juice extracting and distributing method which comprises precooling the whole fruit before cutting; extracting the juice while the fruit is cold; subjecting the juice to a partial vacuum, and then to atmospheric pressure; again subjecting the juice to a partial vacuum, while agitating and slowly freezing the juice to slush form; then freezing the slush to solid form and keeping in solid form until ready for use; and then defrosting.

2. A fruit juice extracting and distributing method which comprises waxing and then precooling whole fruit to at least about 40 degrees F.; cutting the fruit and extracting the juice while the fruit is still cool; subjecting the juice with the pulp still therein to a partial vacuum for extracting air therefrom; then exposing the juice to atmospheric pressure for a short time to flatten the resulting foam; then subjecting the juice with the pulp still therein to a partial vacuum and simultaneously agitating and slowly freezing to slush form; running the slush into containers; storing at about 0° to 10° F. to freeze the slush to solid form and keeping it solid until ready for use; and then defrosting.

3. A method of treating fruit juice comprising running the juice into a mix-freeze cylinder of a freezer, then subjecting the juice to a low pressure partial vacuum of between about 20 to 29 inches of mercury in the freezer thereby preventing absorption of air by the juice, and simultaneously agitating, as with a rotary dasher and slowly freezing the juice at about 28 degrees F. for about 5 to 10 minutes until the juice is frozen to homogeneous mush or slush form thereby to prevent the separating out of the vitamin "C"-bearing solids and the formation of scum during later defrosting; running the slush into containers; storing in a hardening room at about 0° to 10° F. to freeze the slush to brick form; shipping or storing unsealed in the containers or stacked in bricks wrapped in cooking paper or other suitable material until ready for use; and then defrosting at room temperature.

4. A method of treating juices of fruit such as citrus fruits, said method comprising thoroughly precooling the whole fruit to a non-freezing temperature at about 40 degrees F. to prevent start of fermentation therein; cutting the fruit without peeling and extracting the juice from the cut fruit by pressing or reaming, while the fruit is still at 40 degrees F. or below, whereby foam is formed; immediately subjecting the juice to a partial or approximate vacuum for ½ to 5 minutes for extracting the air, from the foam and juice and expanding the residual air in the foam, thereby extracting fermentation supporting oxygen from the juice and foam; then immediately removing said foam by exposing the juice to atmospheric pressure, whereby the foam bubbles are flattened and the foam and air therein substantially eliminated; then simultaneously subjecting the juice to low pressure, agitating and slowly freezing to slush form; freezing the slush to solid form.

5. A fruit juice extracting and distributing method which comprises thoroughly precooling whole citrus fruit to at least about 40 degrees F. to prevent start of fermentation therein; cutting the fruit without peeling and extracting the juice from the cut fruit by pressing or reaming, while the fruit is still at 40 degrees F. or below; immediately subjecting the juice to a partial vacuum for extracting the air, thereby extracting fermentation supporting oxygen; then immediately exposing the juice to atmospheric pressure; then subjecting the juice to a low pressure partial vacuum to prevent reabsorption of air, and simultaneously agitating and slowly freezing the mixture at about 28° F. until the juice is frozen to slush form thereby to prevent the separating out of the solids and the formation of scum during later defrosting and reducing the volume about 32%; running the slush into containers; storing in a hardening room at about 0° to 10° F. to freeze the slush to solid form; storing or shipping the bricks; and defrosting.

VALENTINE RUCH.